(12) United States Patent
Balpe (10) Patent No.: US 9,407,160 B2
(45) Date of Patent: Aug. 2, 2016

(54) SIMPLIFIED CONTROL METHOD FOR A THREE-PHASE AC VOLTAGE-DC VOLTAGE CONVERTER

(75) Inventor: Cédric Balpe, Brunoy (FR)

(73) Assignee: LABINAL POWER SYSTEMS, Blagnac (FR)

( * ) Notice: Subject to any disclaimer, the term of this patent is extended or adjusted under 35 U.S.C. 154(b) by 222 days.

(21) Appl. No.: 14/006,006

(22) PCT Filed: Mar. 21, 2012

(86) PCT No.: PCT/FR2012/050593
§ 371 (c)(1),
(2), (4) Date: Sep. 18, 2013

(87) PCT Pub. No.: WO2012/127170
PCT Pub. Date: Sep. 27, 2012

(65) Prior Publication Data
US 2014/0009987 A1    Jan. 9, 2014

(30) Foreign Application Priority Data
Mar. 21, 2011  (FR) ...................... 11 52332

(51) Int. Cl.
*H02M 7/217* (2006.01)
*H02M 7/23* (2006.01)
*H02M 1/42* (2007.01)
*H02M 7/219* (2006.01)
*H02M 1/00* (2006.01)

(52) U.S. Cl.
CPC .............. *H02M 7/23* (2013.01); *H02M 1/4216* (2013.01); *H02M 1/4233* (2013.01); *H02M 7/219* (2013.01); *H02M 7/217* (2013.01); *H02M 2001/0022* (2013.01); *Y02B 70/126* (2013.01)

(58) Field of Classification Search
CPC ... H02M 7/217; H02M 7/2173; H02M 7/219; H02M 7/21; H02M 7/25; H02M 7/02; H02M 7/04; H02M 1/4216; H02M 1/4213; H02M 1/4233

See application file for complete search history.

(56) References Cited

U.S. PATENT DOCUMENTS

2009/0122582 A1* 5/2009 Ye et al. ...................... 363/89

OTHER PUBLICATIONS

Nussbaumer, T., et al., "Comprehensive Design of a Three-Phase Three-Switch Buck-Type PWM Rectifier," IEEE Transactions on Power Electronics, vol. 22, No. 2, Mar. 2007, pp. 551-562.

(Continued)

*Primary Examiner* — Harry Behm
(74) *Attorney, Agent, or Firm* — Pillsbury Winthrop Shaw Pittman LLP (57) ABSTRACT

A method for controlling a converter for converting an n-phase AC input voltage into a DC output voltage, each phase of the AC input voltage being connected to a switch of the converter. The method includes determining the signs of j characteristic voltages (Va, Vb, Vc, Va-Vb, Vb-Vc, Va-Vc, Va+20°, Vb+20°, Vc+20°, Va−20°, Vb−20°, Vc−20°); determining a reference combination (C1-C12, C1-C18), to which the signs of j characteristic voltages (Va, Vb, Vc, Va-Vb, Vb-Vc, Va-Vc, Va+20°, Vb+20°, Vc+20°, Va−20°, Vb−20°, Vc−20°) correspond, by comparing the signs of the j characteristic voltages to data from a reference table; and (c) opening each switch for an opening time (t1, t2, t3) pre-determined according to the reference combination (C1-C12, C1-C18) identified during the determining of the reference combination.

11 Claims, 7 Drawing Sheets

(56) References Cited

OTHER PUBLICATIONS

Kolar, J., et al., "Space Vector Based Analysis of the Variation and Control of the Neutral Point Potential of Hysteresis Current Controlled Three-Phase/Switch/Level PWM Rectifier Systems," IEEE Catalogue No. 95TH8025, 1995, pp. 22-33.

International Search Report as issued for PCT/FR2012/050593.

Nussbaumer et al.; "Advanced modulation scheme for three-phase three-switch buck-type pwm rectifier preventing mains current distortion originating from sliding input filter capacitor voltage intersections"; PESC 03. 2003 IEEE 34$^{th}$ annual power electronics specialist conference. Conference proceedings. Acapulco, Mexico, Jun. 15-19, 2003; Annual power electronics specialist conference; New York, New York; IEEE US vol. 3, Jun. 15, 2003, pp. 1086-1091.

Pires V F et al, "Space-vector/spl alpha/-/spl beta/modulator and sliding mode control of the three-phase buck type rectifier with freewheeling diode", IECON-2002. Proceedings of the 28$^{th}$ annual conference of the IEEE industrial electronics society. Sevilla, Spain, Nov. 5-8, 2005, Annual conference of the IEEE industrial electronics society IEEE, New York, New York, US vol. 1, Nov. 5 2002, pp. 341-346.

Nishida Y et al., "A new instantaneous-current controller for three-phase buck-boost and buck converters with PFC operation" Applied power electronics conference and exposition, 1995, APEC 95, conference proceedings 1995, tenth annual Dallas, TX, USA Mar. 5-9, 1995, New York, NY, pp. 875-883.

* cited by examiner

SIMPLIFIED CONTROL METHOD FOR A THREE-PHASE AC VOLTAGE-DC VOLTAGE CONVERTER

CROSS-REFERENCE TO RELATED APPLICATIONS

This is the U.S. National Stage of PCT/FR2012/050593, filed Mar. 21, 2012, which in turn claims priority to French Patent Application No. 1152332, filed Mar. 21, 2011, the entire contents of all applications are incorporated herein by reference in their entireties.

TECHNICAL FIELD

The present invention relates to a method for controlling converter from a three-phase AC voltage to a DC voltage.

STATE OF PRIOR ART

Figure 1:
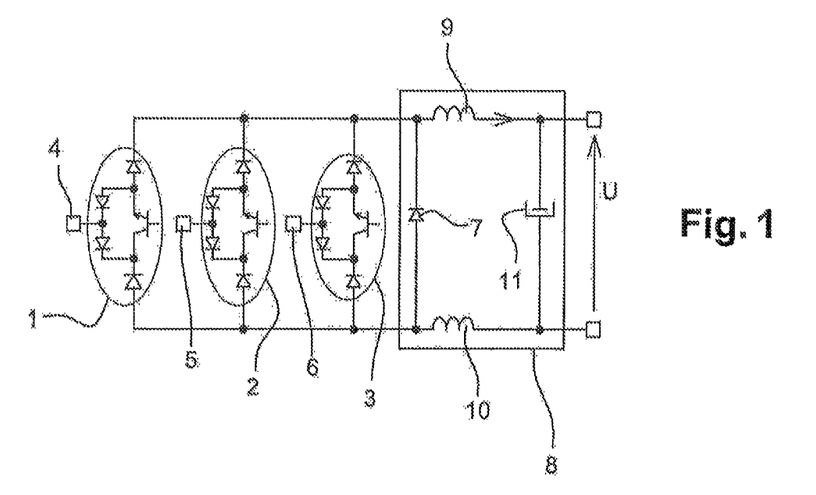
FIG. 1, a schematic representation of a converter, from the back family, of a three-phase AC input voltage into a DC output voltage to which a control method according to the invention is applicable.

FIG. 1 represents a "three-phase buck" type converter which enables a three-phase AC voltage to be converted into DC voltage. This converter includes three switches 1, 2, 3 to which each of the phases 4, 5, 6 of the three-phase AC voltage is connected. The three switches 1, 2, 3 are connected in parallel to each other. The three-phase buck converter also includes a free wheel diode 7 connected in antiparallel on the DC bus as well as an output filter 8 including two inductors 9, 10 and a capacitor 11.

The free wheel diode allows a current continuity when the switches of the circuit are open. This is essential when the current flows in inductors as is the case here because the current should not be suddenly interrupted in an inductor.

Generally, to control such a converter, prior art proposes to measure the input voltages and currents of each switch 1, 2, 3 as well as the output voltage and current of the converter, and to use control loops enabling the average conducting time of the switches 1, 2, 3 to be adjusted according to the input and output voltages and currents.

Such methods allow for a good control of the output voltage. Further, they enable the voltage level of the DC voltage to be controlled. They also enable the switching on of the converter to be controlled by restricting the inrush current.

However, these methods are very complex and require many sensors.

Further, the methods for feedback controlling voltages to the currents in the methods of prior art are very complex, they require very heavy control softwares and very accurate voltage and current sensors.

DISCLOSURE OF THE INVENTION

The invention aims at overcoming drawbacks of prior art by providing a method for controlling a converter from a three-phase AC voltage to a DC voltage which is simpler than methods of prior art.

Another object of the invention is to provide a method for controlling a converter from a simplified three-phase AC voltage to a DC voltage which is simplified but has acceptable performances, that is which enables the three-phase AC-DC conversion to be properly performed, and which enables currents on the AC mains the harmonic content of which is in accordance with standards of electric mains to be rejected.

For this, it is provided, according to a first aspect of the invention, a method for controlling a converter of an n-phase AC input voltage into a DC output voltage, each phase of the AC input voltage being connected to a switch of the converter, the method including the following steps:

(a) a step of determining the signs of j characteristic voltages;
(b) a step of determining a reference combination to which the signs of the j characteristic voltages correspond by comparing the signs of these j characteristic voltages to data from a reference table;
(c) a step of opening each switch for a predetermined opening time according to the reference combination identified during step (b).

Thus, the method according to the invention is particularly advantageous in that, instead of feedback controlling in real time the switches according to the voltages and currents measured at the input and the output of the converter, the method according to the invention only measures characteristic voltages sufficiently accurately to determine the signs of these characteristic voltages. The method determines a reference combination to which the signs of these j characteristic voltages correspond.

The opening times or duty factors of the switches are then controlled according to the reference combination identified.

The method is therefore much simpler than the methods of prior art, first because the measurement of the characteristic voltages does not need to be as accurate as in methods of prior art, since the accurate value of the voltage is not necessary: only its sign is necessary.

Further, the method according to the invention is simplified with respect to methods of prior art because, unlike methods of prior art, in the method according to the invention, the intensities of the phases of the AC voltage at the input of the converter do not need to be measured anymore. Nor do voltage and current of the output voltage need to be measured anymore.

On the other hand, the opening times of the switches do not need to be controlled anymore at any time t according to the amplitudes of measured voltages and currents. Rather, the opening times of the switches are predetermined, and the same opening times of each of the switches always correspond to a given reference combination.

The control method according to the invention can also have one or more of the characteristics hereinafter, taken alone or according to any technical possible combinations.

The reference table preferably contains different reference combinations. Thus, the reference table preferably includes a determined number of reference combinations, such that the j signs of the characteristic voltages are compared to data from the reference table so as to determine the reference combination to which the combination of the j signs of the characteristic voltages corresponds.

In other words, each reference combination is characterized by a set of j signs of characteristic voltages, thus once the j signs of the characteristic voltages are determined, these j reference signs are compared with the data from the reference table so as to determine to which reference combination these j signs of the characteristic voltages correspond.

Advantageously, j is i/2. Indeed, j should be selected so that the number of signs of characteristic voltages is such that each combination of j signs of characteristic voltages corresponds to one and a single reference combination from the reference table.

According to different preferential embodiments, i can be 12 or 18 when n is 3. Indeed, as will be explained in further details in the detailed description part of at least one embodiment, in the case where 12 or 18 reference combinations are chosen, it is particularly easy to determine a set of signs of characteristic voltages such that a set of characteristic signs corresponds to one and a single reference combination.

However, those skilled in the art will be readily capable of adapting the method in the case where i is another number. Generally, the greater I is, the more accurate the control method is.

Advantageously, i a multiple of the number of n phases of the AC input voltage.

According to one embodiment, during step (a), the six following signs are determined:
  the sign of the voltage of each of the phases;
  the sign of differences between two of the voltages of the phases.

Thus, in this embodiment, which corresponds to the case where there are twelve reference combinations, the sign of the voltages of the phases are determined, as well as the sign of their differences.

According to another embodiment, during step (a), the nine following signs are determined:
  the sign of the voltage of each of the phases;
  the sign of the voltage of each of the phases being phase-shifted of +20°;
  the sign of the voltage of each of the phases being phase-shifted of −20°.

For a U(t) voltage having the period T, by "voltage phase-shifted of +20°", it is meant a voltage which is equal to U(t+T/18). In the same way, for a U(t) voltage having the period T, by "voltage phase-shifted of −20°", it is meant a voltage which is equal to U(t−T/18).

Step (a) of determining the sign of characteristic voltages is preferably a step of measuring the sign of these j voltages. In other words, this step (a) is preferably a step of measuring the value of each of these characteristic voltages, with this step of measuring having to be just accurate enough to enable the sign of these j voltages to be determined.

Advantageously, each reference combination is representative of the time interval.

Each time interval preferably corresponds to a fraction of a time period of the AC input voltage.

Advantageously, all the time intervals have the same duration when the electric mains is equilibrated.

The method is preferably repeated once per time interval, which enables it to be simplified with respect to methods of prior art which in turn occur permanently.

Advantageously, the control method is a method for controlling a "three-phase buck" type converter. Such a converter is for example described in the Document entitled "Comprehensive Design of a Three-Phase Three-Switch Buck-Type PWM Rectifier" by Thomas Nussbaumer, Member, IEEE, Martina Baumann, and Johann W. Kolar, Senior Member, IEEE, IEEE TRANSACTIONS ON POWER ELECTRONICS, VOL. 22. NO. 2, MARCH 2007.

Advantageously, the control method is a method for converting a "boost" type converter. Such a converter is for example described in the Document entitled "Space Vector Based Analysis of the Variation and Control of the Neutral Point Potential of Hysteresis Current Controlled Three-Phase/Switch/Level PWM Rectifier Systems", ~O H A N NW. KOLAR, U WED ROFENIKF, R ANZC. ZACH, Technical University Vienna, Power Electronics Section 359.5, GusshausstraDe 27, Vienna A-1040, Austria/Europe, IEEE Catalogue No. 95TH8025 0-7803-2423-41951$4.oOOl995 IEEE.

To implement the method according to the invention, a reference table should have been performed beforehand. In this document, by "reference table", it is meant reference data stored in memory and to which the signs determined during step (a) are compared so as to identify the reference combination to which these signs correspond. To each reference combination corresponds predetermined opening times or duty factors of the switches.

To implement the method according to the invention, a reference table should therefore have been set.

For this, a pattern should for example be made wherein the voltages of the n phases are simultaneously recorded. This pattern is then cut off into i time intervals.

Then j characteristic voltages are identified such that at each time interval, corresponds one and a single combination of signs of characteristic voltages. On the other hand, for each time interval, an average opening time or an average duty factor of each of the switches is determined such that by applying these average opening times or duty factors during each time interval, a DC voltage is obtained at the output of the converter.

The reference table thus made therefore comprises i time intervals, each time interval being characterized by a single combination of j signs of characteristic voltages. On the other hand, to each time interval is associated a predetermined time interval or predetermined duty factor for each of the switches.

Consequently, once such a reference table has been made, at a given time t, j signs of characteristic voltages are determined for the AC voltage in the output of the converter, and then they are compared with the j signs of characteristic voltages of the reference table so as to determine the reference combination to which these j reference signs correspond. Once the reference combination is determined, the switches are opened during the predetermined times which correspond to this reference combination.

BRIEF DESCRIPTION OF THE FIGURES

Further characteristics and advantages of the invention will appear upon reading the following detailed description, in reference to the appended figures, which illustrate.

DETAILED DESCRIPTION OF AT LEAST ONE EMBODIMENT

Figure 11:
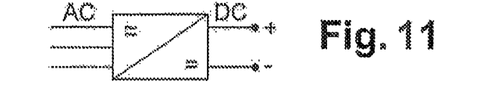
FIG. 11, a schematic representation of a converter.
Figure 13:
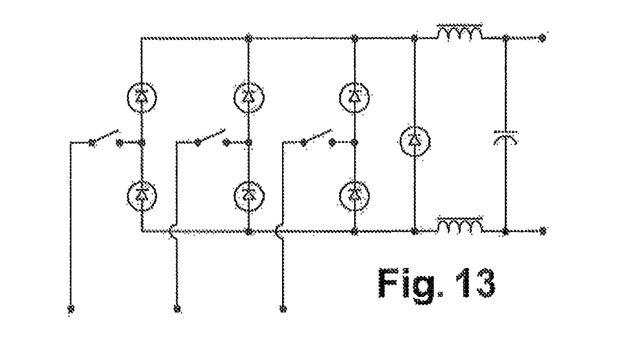
FIG. 13, a schematic representation of a buck converter.

FIG. 1 represents a converter for converting a three-phase AC input voltage into a DC output voltage. FIG. 11 represents the symbol of a converter. The converter of FIG. 1 is called a "three-phase buck converter". The control method is applicable for example to this converter. FIG. 13 represents a block diagram of a buck converter to which the invention is applicable.

Figure 12:
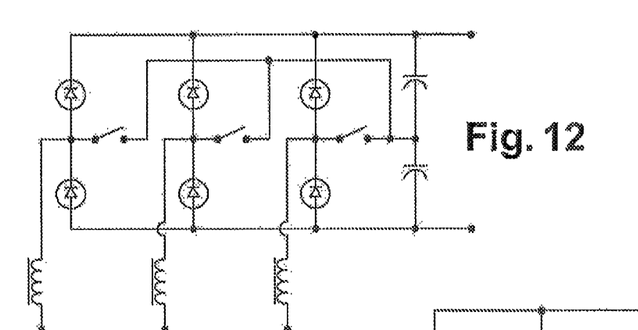
FIG. 12, a schematic representation of a boost converter.

However, the invention is not restricted to this type of converter. The control method according to the invention could for example be applicable to "boost" type converters. FIG. 12 represents a block diagram of a boost converter. Further, the invention is not restricted to the three-phase voltage converters, and could be used for converters from n-phase voltages into a DC voltage.

The converter of FIG. 1 includes three switches 1, 2, 3 to which is connected each of the phases 4, 5, 6 of the three-phase AC input voltage. The three switches 1, 2, 3 are connected in parallel to each other. The converter also includes a free wheel diode 7 connected in antiparallel on the DC bus as well as an output filter 8 including two inductors 9, 10 and a capacitor 11.

In the embodiment of FIG. 1, each switch 1, 2, 3 consists of four diodes and a transistor. The transistor can be of the IGBT, MOSFET, FET type.

Figure 2:
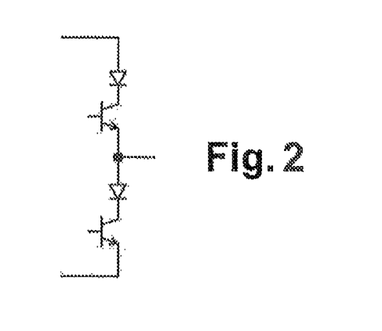
FIG. 2, a switch which could comprise the converter of FIG. 1 instead of the switches to represented in FIG. 1.

However, the control method according to the invention could also be applied to a converter from an n-phase AC voltage to a DC output voltage which has a different composition. Thus, the switches of FIG. 1 could be replaced by other switches, for example switches like the one represented in FIG. 2.

A method for controlling a converter from a three-phase AC input voltage into a DC output voltage according to a first embodiment of the invention will now be described in further details in reference to FIGS. 3 to 6.

First, prior to implementing the control method, a reference table should be made. To do this, in this embodiment, the voltages Va, Vb, Vc are measured and/or recorded at the input of the converter as a function of time t for a time period T.

This time period T is cut off, in this embodiment, into i=12 time intervals T1 to T12. However, it could also be contemplated to divide this time period into another number of time intervals. The number i of time intervals should preferably be a multiple of the number n of phases of the AC input voltage. In this example, the number i of time intervals is thus preferably a multiple of 3.

The time intervals T1 to T12 are preferably of the same duration, which means that in the present case, each time interval T1 to T12 lasts preferably T/12.

Then, the reference table should include data enabling each time interval T1 to T12 to be uniquely identified.

For this, each time interval T1 to T12 is characterized by the signs of j reference characteristic voltages. In the case where there are 12 time intervals, each time interval T1 to T12 can be uniquely characterised by the signs of the six followings characteristic voltages:
the sign of the voltages of each of the phases Va, Vb, Vc of the AC input voltage;
the sign of their differences Va-Vb, Va-Vc, Vb-Vc.

Thus, for example, if within the interval T1, then Va, Vc, Va-Vb, Vc-Va are positive, and Vb, Vb-Vc are negative.

In the same way, in the interval T2, then Va, Va-Vb are positive, Vb, Vc, Vc-Va are negative and Vb-Vc changes its sign. The same can be made for each interval T3 to T12 and thus uniquely characterize each interval by virtue of the signs of the voltages Va, Vb, Vc, Va-Vb, Vb-Vc, Vc-Va.

Each time interval T1 to T12 is thus stored in a reference table as a reference combination C1 to C12 which is characterized by data it contains. Each reference combination C1 to C12 can therefore be uniquely identified by virtue of the six signs it contains.

On the other hand, to each reference combination C1 to C12 is associated a predetermined duty factor or opening time t1, t2, t3 of each of the switches 1 to 3.

For example, to the combination C1, are associated:
a predetermined opening time t1 of 33% for switch 1, which means that switch 1 will be opened for an average duration equal to 33% of T/12;
a predetermined opening time t2 of 100% for switch 2, which means that switch 2 will be opened for an average duration equal to 100% of T/12;
a predetermined opening time t3 of 66% for switch 3, which means that switch 3 will be opened for an average duration equal to 66% of T/12.

Therefore, for each reference combination C1 to C12, predetermined opening times are defined for the switches 1 to 3. These data are stored in the reference table.

Figure 3:
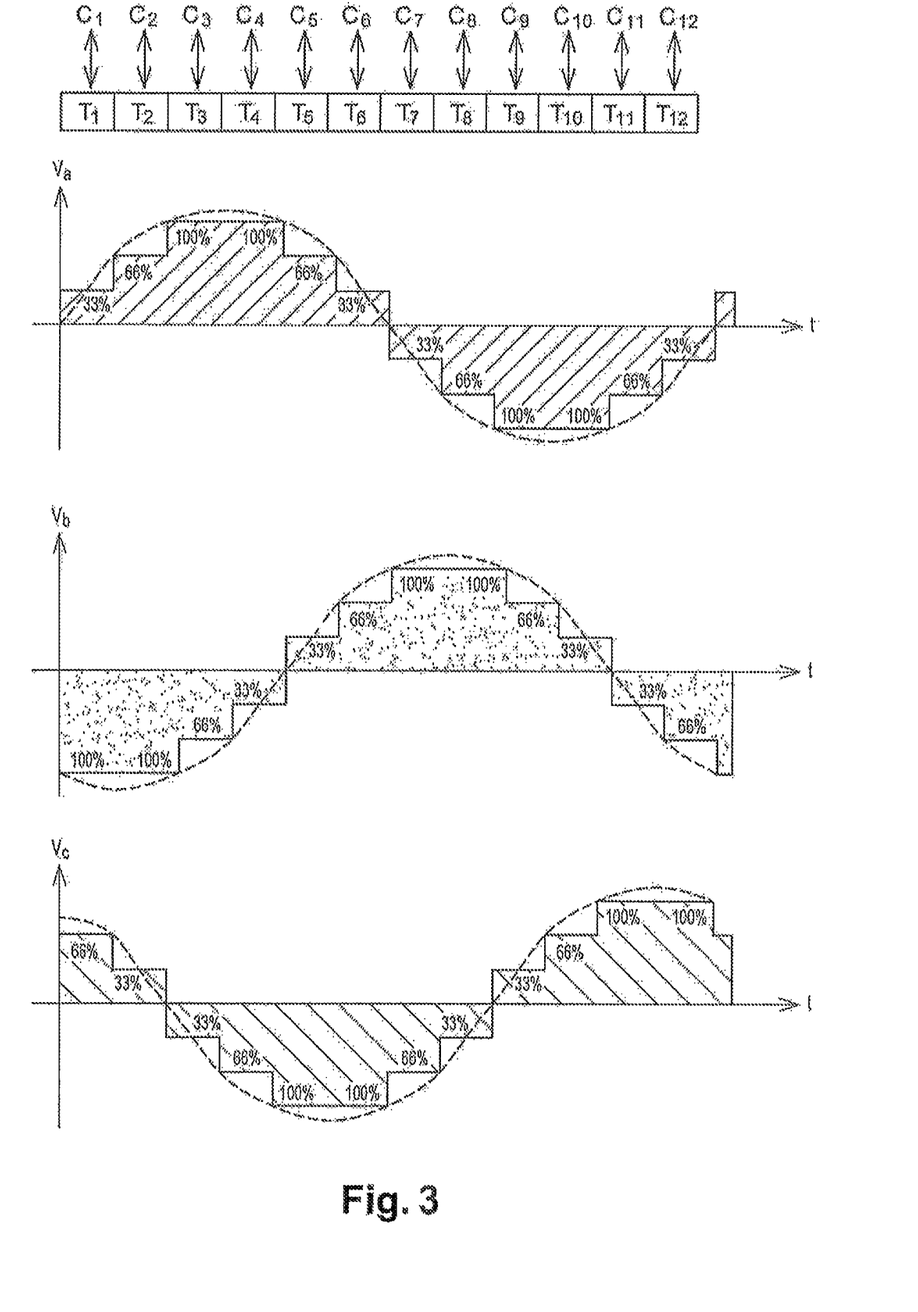
FIG. 3, a schematic representation of a pattern enabling a reference table used in a control method according to one embodiment of the invention wherein 12 reference combinations are used to be made.
Figure 4:
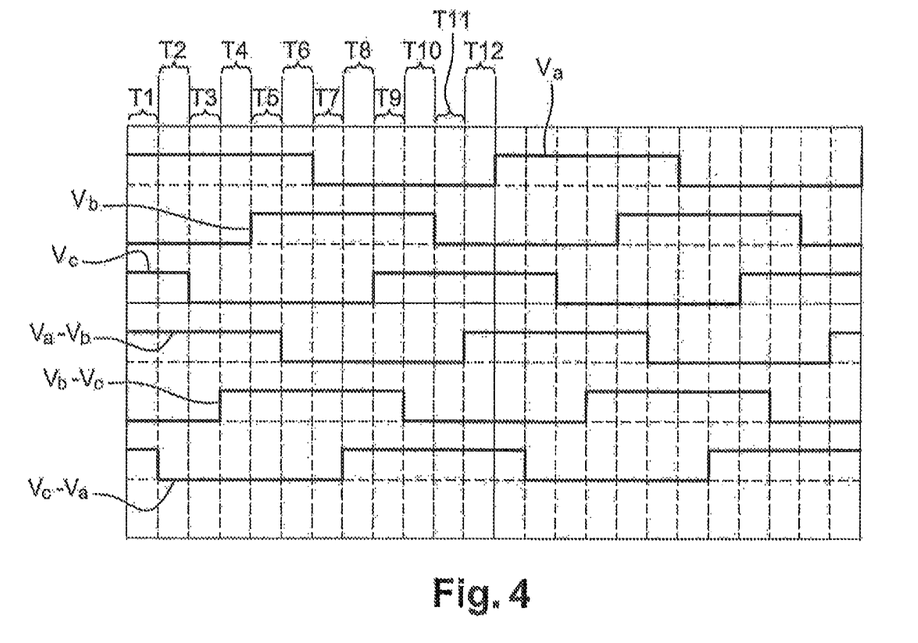
FIG. 4, a schematic representation of the signs of six reference characteristic voltages used in a method according to the embodiment of FIG. 3.
Figure 5:
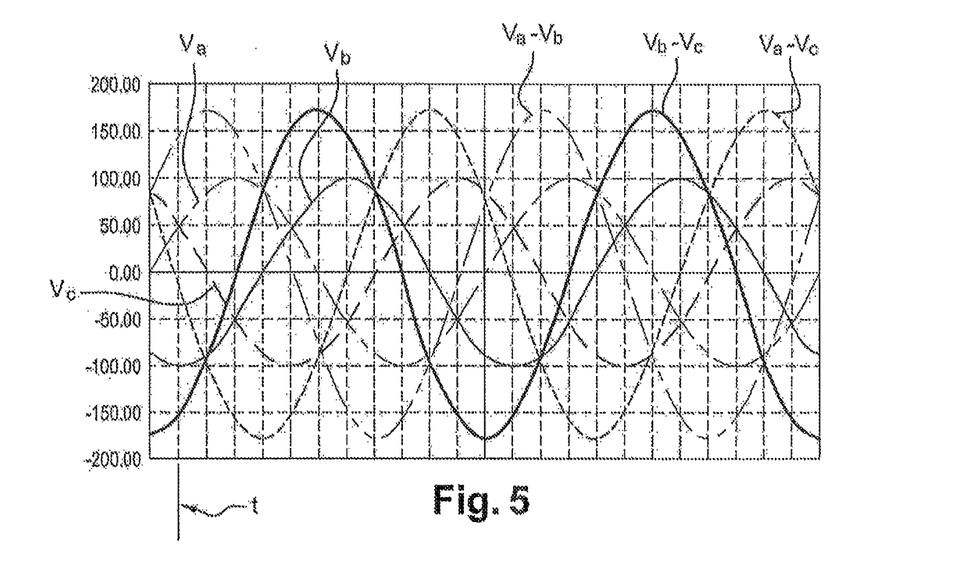
FIG. 5, a schematic representation of the time course of six characteristic voltages relating to the converter of FIG. 1.

The reference table thus obtained is schematically represented in FIGS. 3 and 4.

Once this reference table is set, the method first includes a step (a) of determining the signs of j characteristic voltages. FIG. 4 represents the time course of the characteristic voltages Va, Vb, Vc, Va-Vb, Vb-Vc, Va-Vc.

In this example, the characteristic voltages Va, Vb, Vc, Va-Vb, Vb-Vc, Va-Vc are thus measured at a time t such that the sign of these voltages could be determined. This sign measurement of the signs of Va, Vb, Vc, Va-Vb, Vb-Vc, Va-Vc is preferably a measurement of the value of Va, Vb, Vc, Va-Vb, Vb-Vc, Va-Vc which is just accurate enough to determine the sign of each of these voltages. Such measurements are well known to those skilled in the art.

The method then includes a step (b) of determining a reference combination to which correspond the signs of the j characteristic voltages by comparing the signs of these j characteristic voltages to data from the reference table.

Thus, if during step (a), the following signs have been identified for Va, Vb, Vc, Va-Vb, Vb-Vc, Va-Vc: {+, −, −, +, −, −}, then it is known by virtue of the reference table that it is the reference combination C3, and therefore that this is within time interval T3.

The method then includes a step (c) of opening each switch 1, 2, 3 during a predetermined opening time t1, t2, t3 according to the reference combination C3 identified during step (b). More precisely, to the reference combination C3, are associated the following opening times: {t1=100% of T/12, t2=66% of T/12, t3=33% of T/12}. This corresponds to FIG. 6.

Figure 6:
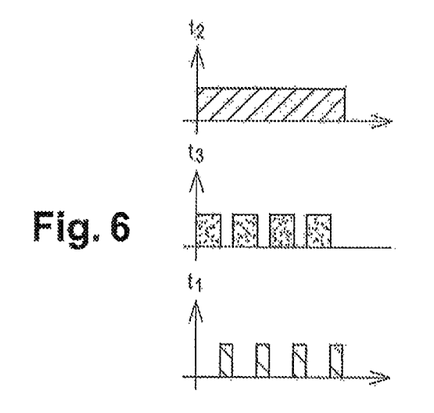
FIG. 6, a schematic representation of average opening durations of the switches of the converter of FIG. 1 during a time slot.

FIG. 6 schematically represents these opening times t1 to t3 applied during time interval T1.

Thus, to each combination C1 to C12, is associated a set of opening duty factors of the switches 1 to 3 which enables the control method to be simplified with respect to methods of prior art.

The trio of duty factors {33%, 66%, 100%} has been proposed because having available the 100% duty factor in the trio affords an optimization of losses due to chopping. The switches which have this 100% duty factor permanently conduct during the time slot.

By "duty factor", it is meant the principle of chopping at a high frequency the electrical measures using switches in order to perform the desired adjustment at the "average" meaning of the term.

A control method according to another embodiment will now be described in reference to FIGS. 7 to 10. This control method uses a cutting off of a period T of the input voltage into 18 time intervals T1 to T18 and not into 12 time intervals anymore as described in reference to FIGS. 1 to 6.

Figure 7:
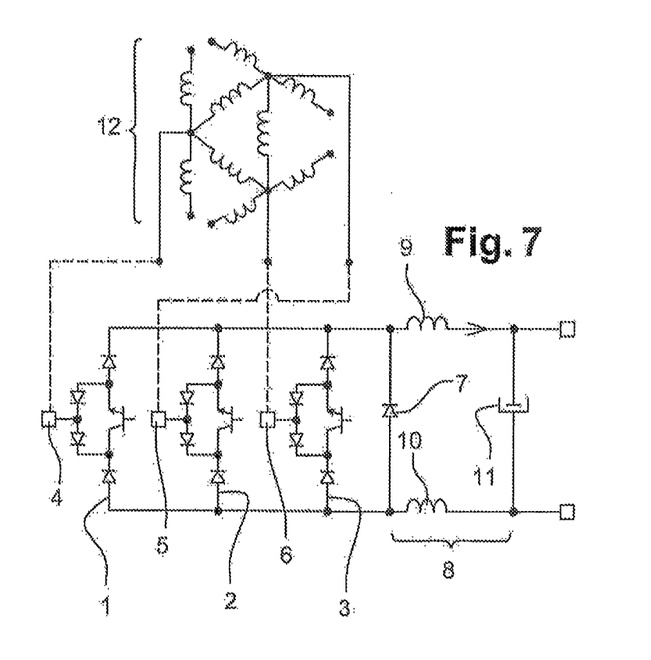
FIG. 7, a schematic representation of a buck converter from a three-phase AC input voltage into a DC output voltage to which a control method according to the invention is applicable.

A converter to which this control method can be applied is represented in FIG. 7. This converter can be identical to that represented in FIG. 1, but it further preferably includes means 12 for generating characteristic voltages.

As previously explained, a reference table is first made. This reference table is schematically represented in FIGS. 8 and 9.

Figure 8:
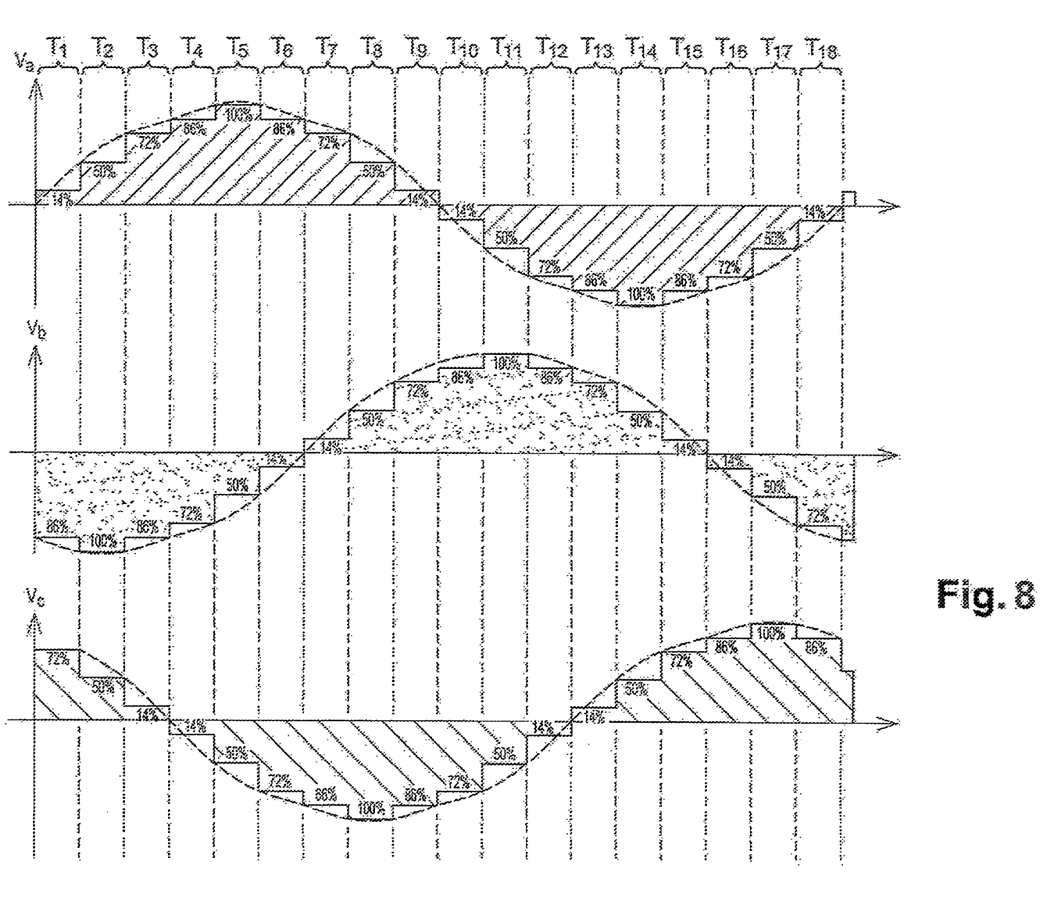
FIG. 8, a schematic representation of a pattern enabling a reference table used in a control method according to the invention wherein 18 reference combinations are used to be made.
Figure 9:
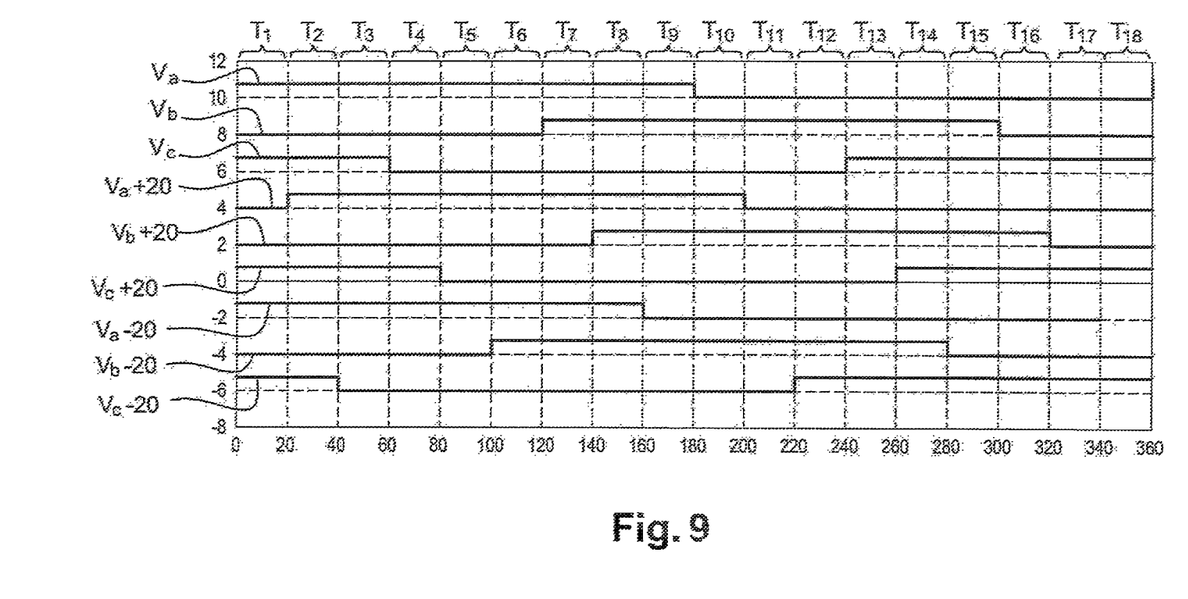
FIG. 9, a schematic representation of the signs of nine reference characteristic voltages used in a method according to the embodiment of FIG. 8.

For this, the voltages of the three phases of the input AC voltage are first recorded during a time period as represented in FIG. 8. The pattern thus made is divided into 18 time intervals T1 to T18. These time intervals T1 to T18 preferably have an equal duration.

As previously explained, each time interval T1 to T18 should be uniquely characterized by a combination of signs of j characteristic voltages.

In this embodiment, for this, the signs of the nine following characteristic voltages are chosen:

the voltages of each of the phases of the AC input voltage Va, Vb, Vc;

the voltages of each of the phases of the AC input voltage being phase-shifted of +20°: Va+20°, Vb+20°, Vc+20°;

the voltages of each of the phases of the AC input voltage being phase-shifted of −20°: Va−20°, Vb−20°, Vc−20°.

As illustrated in FIG. 9, the signs of these nine characteristic voltages enable the 18 time intervals T1 to T18 to be discriminated, since each time interval is characterized by a single combination of these 9 reference signs.

To provide the voltages Va+20°, Vb+20°, Vc+20°, Va−20°, Vb−20°, Vc−20°, the control converter preferably includes means 12 for generating characteristic voltages. These generating means 12 provide "image" signals of the electrical mains time-shifted (advanced and delayed). If the electrical mains is vectorially represented, for each single voltage (Va, Vb, Vc) is obtained a voltage shifted of +20° and −20°. The circuit proposed to provide this function to switch from {Va, Vb, Vc} to {Va, Vb, Vc, Va+20, Vb+20, Vc+20, Va−20, Vb−20, Vc−20} is for example a signal autotransformer. This is an electromagnetic element which includes three bars and nine coils.

Each time interval T1 to T18 is thus represented in the reference table by a reference combination C1 to C18 which is characterized by the nine signs it contains.

Besides, the reference table also contains duty factors or opening durations of each switch 1, 2, 3 which are predetermined and associated with each combination C1 to C18 of the reference table.

In this example, the following duty factors {14%, 86%, 72%} are for example selected for the reference combination C1 and trios of duty factors taken in the following set (14%, 50%, 72%, 86%, 100%) for other reference combinations. However, such duty factors are only mentioned by way of example and those skilled in the art will be readily capable of adapt the method according to the invention to other duty factors.

Figure 10:
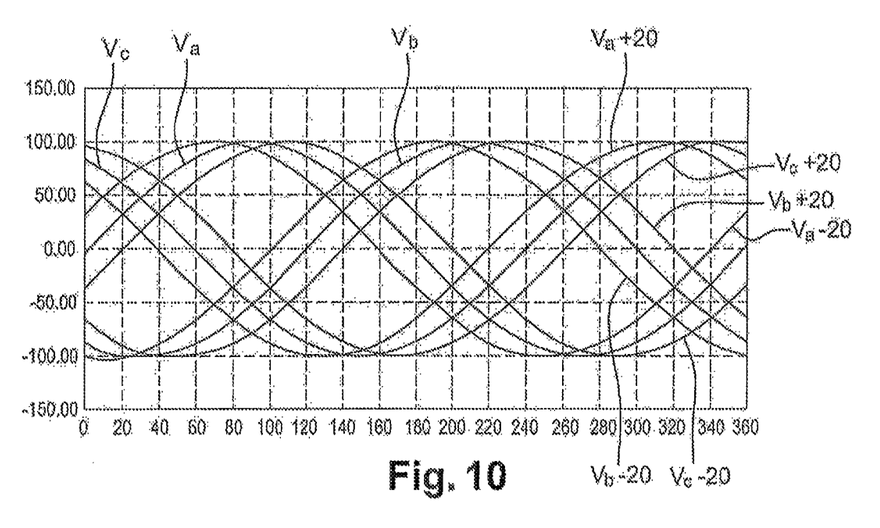
FIG. 10, a schematic representation of the time course of nine characteristic voltages relating to the converter of FIG. 1.

Once the reference table is thus made, the method includes, as in the previous embodiment, the following steps:

Procedure to be, followed to operate the converter the characteristic voltages Va, Vb, Vc, Va+20°, Vb+20°, Vc+20°, Va−20°, Vb−20°, Vc−20° are measured just accurately enough to identify their signs; the time course of these voltages is represented in FIG. 10;

the signs of these voltages are determined;

it is identified at which combination C1 to C18 these nine signs of voltages correspond, and thus the time interval is known;

the predetermined duty factors are applied to the switches.

The method according to the invention is particularly advantageous because it is much simpler than those of prior art since:

it does not require a great accuracy on the measures to be determined since the signs of the voltages of the electrical mains are run instead of the time course of the amplitudes;

it is no longer required to measure parameters relating to the output voltage nor the currents of the input voltages;

it does not require a control loop.

Of course, the invention is not restricted to the embodiments described in reference to the figures and alternatives could be contemplated without departing from the scope of the invention. In particular, other duty factors, other characteristic voltages, other time intervals . . . could be selected.

In the other hand, the invention could be applied to converters other than those described in reference to the figures.

The invention claimed is:

1. A method for controlling a converter from an n-phase AC input voltage to a DC output voltage, each phase of the AC input voltage being connected to a switch of the converter, the method comprising:

determining the signs of j characteristic voltages;

determining a reference combination to which the signs of the j characteristic voltages correspond by comparing the signs of the j characteristic voltages to data from a reference table, said reference table comprising a number i of different reference combinations, the number i being a multiple of the number n of phases of the AC input voltage, the j characteristic voltages comprising a first set of AC input voltages and a second set of characteristic voltages, each of the characteristic voltages of the second set being obtained by either carrying out a difference of input voltages, or carrying out a phase shift of an input voltage, and opening each switch for a predetermined opening time according to the reference combination identified during the determining of the reference combination, wherein an opening time value of each switch is predetermined before determining the reference combination.

2. The controlling method according to claim 1, wherein j is i/2.

3. The controlling method according to claim 2, wherein i is 12.

4. The controlling method according to claim 3, wherein during the determining of the signs of j characteristic voltages, the six following signs are determined:

the sign of the voltage of each of the phases;

the sign of the differences between two of the voltages of the phases.

5. The controlling method according to claim 2, wherein i is 18.

6. The controlling method according to claim 5, wherein during the determining of the signs of j characteristic voltages, the nine following signs are determined:

the sign of the voltage of each of the phases;

the sign of the voltage of each of the phases being phase-shifted of +20°;

the sign of the voltage of each of the phases being phase-shifted of −20.

7. The controlling method according to claim 1, wherein each reference combination is representative of a time interval.

8. The controlling method according to claim 7, wherein each time interval corresponds to a fraction of the time period of the AC input voltage.

9. The controlling method according to claim 1, wherein each reference combination is representative of a time interval.

10. The controlling method according to claim 9, wherein each time interval corresponds to a fraction of the time period of the AC input voltage.

11. The controlling method according to claim 1, wherein the data of the reference table are associated with the predetermined opening time of each switch, and wherein said reference table is determined before determining the signs of j characteristic voltages.

* * * * *